(12) United States Patent
Louven et al.

(10) Patent No.: US 10,746,143 B2
(45) Date of Patent: Aug. 18, 2020

(54) INTERNAL COMBUSTION ENGINE AND METHOD FOR OPERATING AN INTERNAL COMBUSTION ENGINE

(71) Applicant: Ford Global Technologies, LLC, Dearborn, MI (US)

(72) Inventors: Georg Louven, Neuwied (DE); Klemens Grieser, Langenfeld (DE); Oliver Berkemeier, Bergisch Gladbach (DE); Martin Wirth, Remscheid (DE); Ulrich Kramer, Bergisch Gladbach (DE); Helmut Hans Ruhland, Eschweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/667,865

(22) Filed: Aug. 3, 2017

(65) Prior Publication Data

US 2018/0038328 A1 Feb. 8, 2018

(30) Foreign Application Priority Data

Aug. 5, 2016 (DE) .................. 10 2016 214 596

(51) Int. Cl.
*F02M 43/04* (2006.01)
*F02D 19/06* (2006.01)
(Continued)

(52) U.S. Cl.
CPC ......... *F02M 43/04* (2013.01); *F02D 19/0615* (2013.01); *F02D 19/0647* (2013.01);
(Continued)

(58) Field of Classification Search
CPC ............... F02M 43/04; F02M 21/0212; F02M 21/0215; F02M 21/0236; F02M 21/0239;
(Continued)

(56) References Cited

U.S. PATENT DOCUMENTS 5,450,832 A 9/1995 Graf
6,543,423 B2 4/2003 Dobryden et al.
(Continued)

FOREIGN PATENT DOCUMENTS

AU 2006200438 A1 8/2007
CN 2588062 Y 11/2003
(Continued)

*Primary Examiner* — Syed O Hasan
(74) *Attorney, Agent, or Firm* — Geoffrey Brumbaugh; McCoy Russell LLP

(57) ABSTRACT

Examples are provided for switching an engine fuel supply. One example system includes a direct-injection engine including a cylinder, an LPG tank for storing a LPG fuel, a CNG tank for storing a CNG fuel, a gas switching valve, a high-pressure pump connected between the LPG tank and the gas switching valve, a pressure-limiting valve connected between the CNG tank and the gas switching valve, a fuel distributor configured to be supplied with one or more of the LPG fuel and the CNG fuel via the gas switching valve, an LPG injection valve coupled to the cylinder, a CNG injection valve coupled to the cylinder, the LPG injection valve and the CNG injection valve configured to be supplied with fuel via the fuel distributor; and a controller configured to control the gas switching valve depending on an aggregate state of the fuel disposed in the fuel distributor.

19 Claims, 4 Drawing Sheets

(51) Int. Cl.
*F02M 21/02* (2006.01)
*F02M 43/02* (2006.01)
*F02M 51/00* (2006.01)
*F02M 63/02* (2006.01)

(52) U.S. Cl.
CPC .... *F02M 21/0212* (2013.01); *F02M 21/0215* (2013.01); *F02M 21/0236* (2013.01); *F02M 21/0239* (2013.01); *F02M 21/0245* (2013.01); *F02M 43/02* (2013.01); *F02M 51/005* (2013.01); *F02M 63/027* (2013.01); *F02M 2200/247* (2013.01); *F02M 2200/248* (2013.01); *Y02T 10/32* (2013.01); *Y02T 10/36* (2013.01)

(58) Field of Classification Search
CPC ................ F02M 21/0245; F02M 43/02; F02D 19/0615; F02D 19/0647
See application file for complete search history.

(56) References Cited

U.S. PATENT DOCUMENTS

| | | | |
|---|---|---|---|
| 6,591,817 B2 | 7/2003 | Deutsch | |
| 9,046,049 B2 | 6/2015 | Jeon et al. | |
| 2003/0015178 A1* | 1/2003 | Dobryden | F02D 19/061 123/480 |
| 2011/0017174 A1* | 1/2011 | Ulrey | F02D 19/0628 123/456 |
| 2012/0318248 A1* | 12/2012 | Nakayama | F02D 19/0647 123/575 |
| 2015/0047350 A1* | 2/2015 | Pursifull | F02D 19/0647 60/611 |
| 2015/0047590 A1 | 2/2015 | Kim | |
| 2015/0159570 A1 | 6/2015 | Seo | |
| 2016/0177860 A1* | 6/2016 | Pursifull | F02D 41/0025 123/294 |

FOREIGN PATENT DOCUMENTS

| | | |
|---|---|---|
| CN | 202140180 U | 2/2012 |
| CN | 204877718 U | 12/2015 |
| DE | 10146063 A1 | 4/2003 |
| DE | 102010045593 A1 | 3/2012 |
| KR | 100865296 B1 | 10/2008 |
| KR | 1020130069031 A | 6/2013 |
| WO | 03036073 A1 | 5/2003 |

\* cited by examiner

INTERNAL COMBUSTION ENGINE AND METHOD FOR OPERATING AN INTERNAL COMBUSTION ENGINE

CROSS REFERENCE TO RELATED APPLICATION

The present application claims priority to German Patent Application No. 102016214596.7, filed Aug. 5, 2016. The entire contents of the above-referenced application are hereby incorporated by reference in its entirety for all purposes.

FIELD

The disclosure relates to a method for operating an internal combustion engine supplied with LPG fuel or CNG fuel.

BACKGROUND/SUMMARY

Internal combustion engines are known that may be operated optionally with a liquid auto gas (Liquefied Petroleum Gas; LPG), below known as LPG fuel, or a compressed natural gas (Compressed Natural Gas; CNG), known below as CNG fuel. Such internal combustion engines comprise a combustion engine, an LPG tank for storing the LPG fuel, and a CNG tank for storing the CNG fuel. Because at least one of said types of fuel is available in many countries, a supply of fuel for the corresponding internal combustion engine can be widely assured. Such an internal combustion engine is known from CN 204 877 718 U, for example.

However, the inventors herein have recognized issues with the above configurations. In combustion engines operating with LPG as fuel, LPG may be compressed in tanks in a liquid aggregate form. Upon release from the tank, LPG may be converted to a gas aggregate form under atmospheric pressure and normal ambient temperatures. In combustion engines capable of operating with either a CNG fuel or an LPG fuel with a single common fuel rail (also referred to herein as a distributor), it is possible to make a switch from an LPG fuel to a CNG fuel and vice versa, wherein CNG fuel is typically stored in CNG tanks in a gas aggregate form. During operations of the internal combustion engine, gas pressures and temperatures may vary considerably in the fuel distributor, and therefore the aggregate state of the respective fuels in the fuel distributor may be unknown and vary significantly depending on the operating conditions at the time of transition between the fuels. Thus, during operation of engines including both a CNG and an LPG fuel supply, mixing of different fuels with different aggregate states in the fuel distributor may occur, adversely affecting the supply of fuel to the internal combustion engine. Further, such a mixing of different fuels in different aggregate states may not only be poorly controllable, but may also further undesirably allow for a transiently unknown supply of fuel to the internal combustion engine.

Additionally, in combustion engines operating with LPG as fuel, hot start of a vehicle (e.g. engine startup when outside temperatures are hot) may not be instantaneous due to vaporization of the LPG in the fuel rail whilst the engine is stopped. Furthermore, engines operating with LPG as fuel, when the combustion engine and therefore the fuel supply is turned off, the LPG present in the fuel lines may switch into a gas aggregate state, necessitating a need for maintaining high pressure in the LPG fuel upstream of a high pressure pump to prevent fuel vaporization. Such fuel vaporization may make an engine restart difficult and delayed.

The inventors herein have recognized the above issues and provide an approach to at least partly address the issues. In one example, an engine system comprises a combustion engine with direct injection, an LPG tank for storing a LPG fuel, a CNG tank for storing a CNG fuel, an electrically controlled gas switching valve, a high-pressure pump connected between the LPG tank and the gas switching valve, a pressure-limiting valve connected between the CNG tank and the gas switching valve, a fuel distributor configured to be supplied with fuel via the gas switching valve, an LPG injection valve and a CNG injection valve per cylinder of the internal combustion engine, wherein the LPG injection valves and the CNG injection valves are configured to be supplied with fuel via the fuel distributor, and a controller to control the gas switching valve depending on an aggregate state of fuel disposed in the fuel distributor.

According to the example configuration described above, the switch between the respective fuels may be a consequence of the pressure and temperature existent in the fuel distributor and further, the method of switching from LPG to CNG and vice versa with the use of separate fuel injectors for both CNG and LPG, ensures that the two types of fuel with different aggregate states do not get mixed in the fuel distributor. Further, to increase the power of the internal combustion engine, the compression ratio of the cylinders may be increased without knocking occurring. The selective direct injection of LPG fuel and CNG fuel is controlled by the control and/or regulating electronics and the gas switching valve. The selective supply of LPG fuel or CNG fuel enables starting of the internal combustion engine under virtually any temperature conditions. Further, the availability of the additional CNG fuel with separate CNG injection valves, the hot starting problem connected with an LPG fuel supply may be reduced, for example the gaseous LPG fuel that could not be injected via the LPG injection valves may now be injected via the CNG injection valves during engine startup. In addition, a high pressure in the LPG fuel upstream of the high-pressure pump is not necessary, because the combustion engine can also be operated with a gaseous fuel, such as the CNG fuel for example. Furthermore, a reduction of $CO_2$ emissions may be achieved by the use of LPG fuel and CNG fuel as described herein compared to the conventional use of gasoline. Furthermore, the internal combustion engine according to the disclosure can be operated using less expensive fuels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
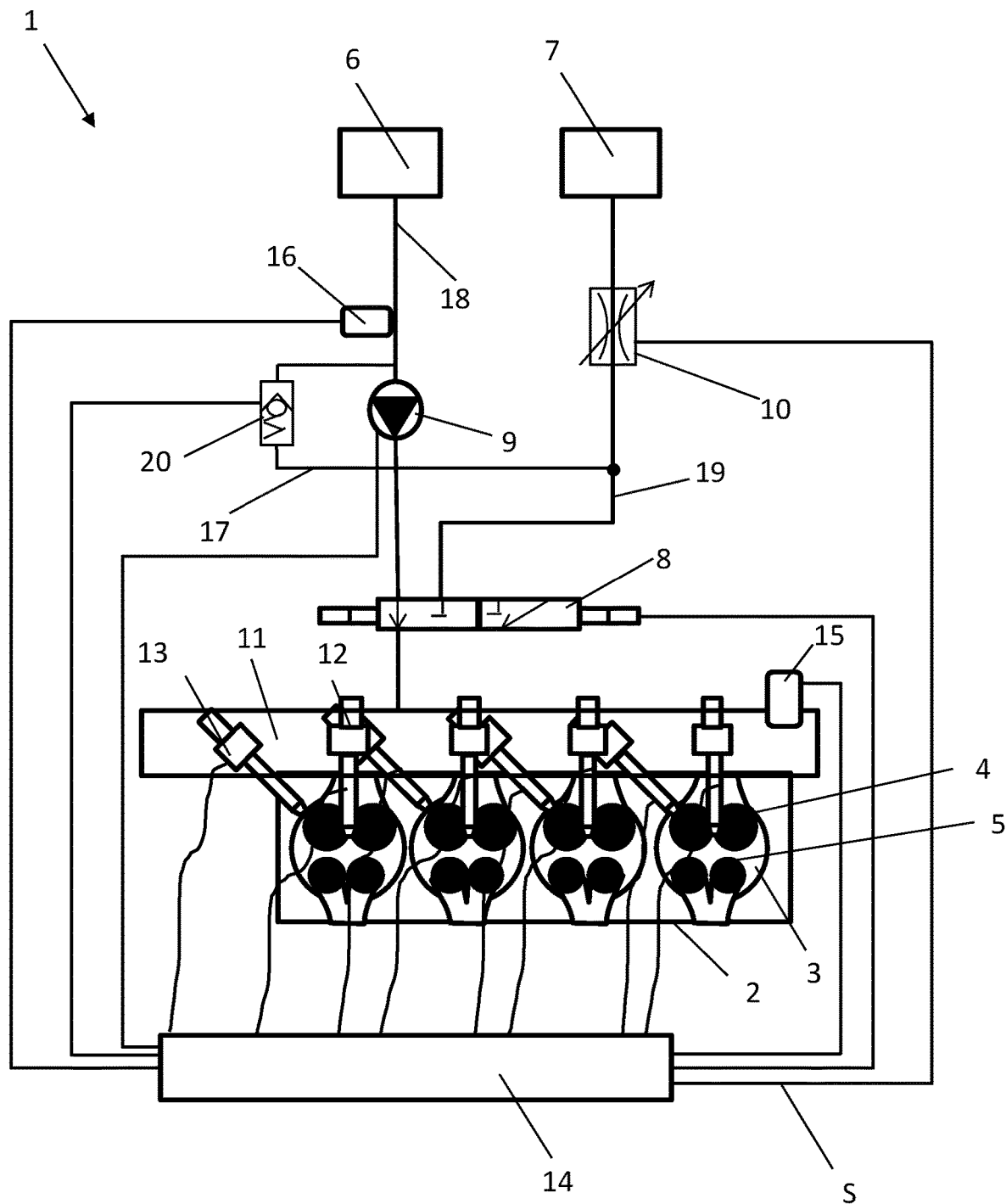
FIG. 1 shows a schematic representation of an embodiment of an internal combustion engine capable of switching between two kinds of fuel.

The following description relates to systems and methods for an internal combustion engine wherein LPG fuel and CNG fuel may be supplied to a single fuel distributor and injected from there directly into the cylinders of the combustion engine via the LPG injection valves or the CNG injection valves.

The switch between the respective fuels may be a consequence of the pressure and temperature existent in the fuel distributor. In combustion engines capable of operating with CNG fuel or LPG fuel with a single common fuel distributor, it is possible to make a switch from the LPG fuel to the CNG fuel and vice versa, wherein LPG fuel is stored compressed in an LPG tank in a liquid aggregate form and CNG fuel is stored in a CNG tank in a gas aggregate form. During operations of the internal combustion engine, gas pressures and temperatures may vary considerably in the fuel distributor, and therefore the aggregate state of the fuel in the fuel distributor may also vary. By the control of a gas switching valve and further depending on an aggregate state of the respective fuel disposed in the fuel distributor, it is ensured that in the case of a changeover between the two types of fuel, mixing of the liquid LPG fuel with gaseous CNG fuel in the fuel distributor does not occur, in particular that the two fuels with mutually different gas pressures and temperatures are not mixed with each other. Such mixing of fuels with different aggregate states can adversely affect the supply of fuel to the internal combustion engine, is poorly controllable and is accompanied by a transiently unknown supply of fuel to the internal combustion engine.

In one embodiment, the control and/or regulating electronics are configured to change over from an LPG supply to a CNG supply. When the engine is supplied LPG, the high-pressure pump is turned on and the LPG fuel is passed via the gas switching valve in an LPG switch state to the LPG injection valves and is injected via the LPG injection valves. When the engine is supplied a CNG, the CNG fuel (with the pressure thereof reduced by the pressure-limiting valve) is passed via the gas switching valve in a CNG switch state to the CNG injection valves and is injected via the CNG injection valves. The method comprises first turning off the high-pressure pump, and determining if a gaseous aggregate state of the LPG fuel disposed in the fuel distributor exists. A gaseous aggregate state of LPG fuel in the fuel distributor may be determined by one or more sensor unit(s), which may be connected to the control and/or regulating electronics of the internal combustion engine. In on example, the sensor unit may include a pressure sensor to measure the common fuel distributor pressure and a temperature sensor to detect temperature in the fuel distributor during engine operation. In other examples, separate temperature and pressure sensors may be provided. In addition, a sensor to detect the gas composition of fuel may also be included. These sensors may optionally be positioned on the fuel distributor and/or in the exhaust system and may further be in operable/communicative connection with the control and/or regulating electronics to determine when a switch between fuels needs to be performed.

Based on the sensor information, if a gaseous state of LPG fuel is detected in the fuel distributor, a rapid and temporary switch over with an overlap from injection via the LPG injection valves to injection via the CNG injection valves and then to switch the gas switching valve from the LPG switch state to the CNG switch state is made. Said changeover process ensures that the two types of fuel with different aggregate states are not mixed in the fuel distributor. Following the turning off of the high-pressure pump and before the presence of a gaseous aggregate state of the LPG fuel disposed in the fuel distributor, which can be determined as described above, the LPG fuel continues to be injected via the LPG injection valves into the cylinders of the combustion engine in the case of continuing ignition and combustion in the combustion engine, whereby the pressure in the fuel distributor is reduced. From a certain pressure and a certain temperature measured in the fuel distributor, it may be determined that the LPG fuel in the fuel distributor is gaseous. Once the LPG fuel in the fuel distributor is determined to be gaseous, there is a rapid and temporary overlapping changeover from injection via the LPG injection valves to injection via the CNG injection valves, so that the gaseous LPG fuel present in the fuel distributor is now injected via the CNG injection valves into the cylinders of the combustion engine. During this, once the pressure in the fuel distributor falls below a predetermined pressure limit value (e.g., as determined by the pressure sensor), the gas switching valve is switched from the LPG switch state into the CNG switch state, where after the combustion engine is supplied with the gaseous CNG fuel alone. During the temporary overlapping changeover, both the LPG injection valves and the CNG injection valves are used for injection over a certain period of time.

In another embodiment, the control and/or regulating electronics are arranged to change over from the CNG supply, whereby the CNG fuel with the pressure thereof reduced by the pressure-limiting valve is passed via the gas switching valve in the CNG switch state to the CNG injection valves and is injected via the CNG injection valves, to the LPG supply, whereby the high-pressure pump is turned on and the LPG fuel is passed to the LPG injection valves via the gas switching valve in the LPG switch state and is injected via the LPG injection valves. The method comprises first turning on the high-pressure pump, then switching the gas switching valve from the CNG switch state to the LPG switch state and determining if the aggregate state of the LPG fuel present in the common fuel distributor is liquid. In one example, an aggregate state of LPG fuel in the fuel distributor may be determined by sensor units described above (e.g. pressure sensor, temperature sensor, and a sensor to detect of the composition fuel), which may be communicatively connected to the control and/or regulating electronics of the internal combustion engine. Thus, if the aggregate state of the LPG fuel is determined to be liquid in the fuel distributor, a rapid and temporary change over from injection via the CNG injection valves to injection via the LPG injection valves with an overlap is made. Said changeover process ensures that the two types of fuel with different aggregate states are not mixed in the fuel distributor. After the switch-on of the high-pressure pump, the gas switching valve is switched with a time offset from the CNG switch state to the LPG switch state. From a certain temperature and a certain pressure in the fuel distributor, the LPG fuel in the fuel distributor is determined to be liquid. Once the LPG fuel present in the fuel distributor is liquid, there is a rapid and temporary changeover with an overlap from injection via the CNG injection valves to injection via the LPG injection valves, depending on a pressure level in the fuel distributor. During the temporary overlapping changeover, both the LPG injection valves and the CNG injection valves are used for injection over a certain period of time.

In an example, a method for operating an internal combustion engine of a motor vehicle is provided. The engine may be a direct injection engine and the vehicle may comprise at least one LPG tank for storing a LPG fuel, at least one CNG tank for storing a CNG fuel, at least one electrically controlled gas switching valve, at least one high-pressure pump connected between the LPG tank and the gas switching valve, at least one pressure-limiting valve connected between the CNG tank and the gas switching valve, at least one fuel distributor that is configured to be supplied with fuel via the gas switching valve, at least one LPG injection valve and at least one CNG injection valve per cylinder of the combustion engine. The method may include supplying the LPG injection valves and the CNG injection valves with fuel via the fuel distributor, and controlling the gas switching valve depending on an aggregate state of the respective fuel disposed in the fuel distributor.

According to an embodiment, the aggregate state of the respective fuel disposed in the fuel distributor is determined from a temperature occurring in the fuel distributor, a pressure occurring in the fuel distributor, and a composition of the fuel. The advantages mentioned above with reference to the corresponding embodiment of the internal combustion engine are associated with this embodiment.

According to a further embodiment, to change over from an LPG supply (whereby the high-pressure pump is turned on and the LPG fuel is passed via the gas switching valve in an LPG switch state to the LPG injection valves and is injected via the LPG injection valves) to a CNG supply (whereby the CNG fuel with the pressure thereof reduced by the pressure-limiting valve is passed via the gas switching valve in a CNG switch state to the CNG injection valves and is injected via the CNG injection valves) first the high-pressure pump is turned off, then in the presence of a gaseous aggregate state of the LPG fuel disposed in the fuel distributor, there is a rapid and temporary changeover with an overlap from injection via the LPG injection valves to injection via the CNG injection valves. Then, the gas switching valve is switched from the LPG switch state to the CNG switch state. The advantages mentioned above with reference to the corresponding embodiment of the internal combustion engine are associated with this embodiment.

According to a further embodiment, to change over from the CNG supply (whereby the CNG fuel with the pressure thereof reduced by the pressure-limiting valve is passed via the gas switching valve in the CNG switch state to the CNG injection valves and is injected via the CNG injection valves) to the LPG supply (whereby the high-pressure pump is turned on and the LPG fuel is passed via the gas switching valve in the LPG switch state to the LPG injection valves and is injected via the LPG injection valves), first the high-pressure pump is switched on, then the gas switching valve is switched from the CNG switch state to the LPG switch state. Then in the presence of a liquid aggregate state of the LPG fuel disposed in the fuel distributor, there is a rapid and temporary changeover with an overlap from injection via the CNG injection valves to injection via the LPG injection valves. The advantages mentioned above with reference to the corresponding embodiment of the internal combustion engine are associated with this embodiment.

Turning now to FIG. 1 the arrangement according to the disclosure comprises an engine system 1 comprising a combustion engine 2 operating with direct injection. The combustion engine with direct injection may be suitably ignited combustion engine (e.g., via spark ignition or via injection of a self-igniting fuel). The combustion engine 2 comprises four combustion cylinders 3 into which the respective fuel can be directly injected, wherein each of the cylinders includes two inlet valves 4 and two exhaust valves 5 as shown in FIG. 1. Furthermore, the engine system 1 comprises a LPG tank 6 for storing a LPG fuel and a CNG tank 7 for storing a CNG fuel. In one example, the LPG fuel stored in LPG tank 6 may include a mixture of propane and butane and in other examples, may include propylene, butylene, etc. in various mixtures. Further, the components of LPG are typically gaseous at standard temperature and pressures (e.g., room temperature at atmospheric pressure). In one example, the CNG fuel stored in CNG tank 7 may comprise methane while in other examples, the CNG fuel may also include other types of gaseous fuel such as ethane, propane, etc.

In addition, engine system 1 may comprise an electrically controlled gas switching valve 8 that is implemented as a 3/2-way valve. In one example, the gas switching valve 8 may be a solenoid valve that changes position when energized. In other examples, the gas switching valve may be a hydraulic, pneumatic, or electrically actuated valve. The actuator of the gas switching valve may be operably coupled to a controller, such as the control and/or regulating electronics 14. The gas switching valve may comprise an LPG switch state, in which the LPG fuel may be delivered via the gas switching valve to the fuel distributor, and a CNG switch state, in which the CNG fuel is delivered via the gas switching valve to a fuel distributor.

A high-pressure pump 9 may be in fluid connection between the LPG tank 6 and the gas switching valve 8 and may be used to pressurize the fuel distributor 11 to a sufficient pressure for direct injection. The high pressure pump 9 may be operably coupled to the control and/or regulating electronics 14 and may be controlled by the control and/or regulating electronics 14. For example, the high-pressure pump may be controlled to output fuel having a pressure in a range from 100 bar through 200 bar, in particular from 150 bar. Further, a pressure-limiting valve 10 may be connected between the CNG tank 7 and the gas switching valve 8 and may be used for reduction of pressure in the CNG fuel so as to ensure a gaseous CNG fuel following said pressure reduction, such that the fuel distributor 11 may be supplied with gaseous CNG fuel via the gas switching valve 8. The pressure-limiting valve may have a signaling connection to the control and/or regulating electronics 14 to enable it to be controlled by said electronics.

Furthermore, each cylinder of the combustion engine 2 may comprise an LPG injection valve 12 and a CNG injection valve 13, wherein the LPG injection valves 12 and the CNG injection valves 13 may each be supplied with fuel via the fuel distributor 11. Each cylinder of the combustion engine 2 may have at least one LPG injection valve and a CNG injection valve as shown in FIG. 1. The CNG injection valves 13 may be disposed on the cylinders 3 such that the CNG fuel can be injected into the respective cylinders 3 from the side therewith. The LPG injection valves 12 may be disposed on the cylinders 3 such that the LPG fuel can be injected centrally into the respective cylinders 3 therewith.

Furthermore, the engine system 1 may comprise of an electronic controller, which may also be referred to herein as the control and/or regulating electronics 14, for controlling and/or regulating the operation of the engine system 1. The control and/or regulating electronics 14 may comprise a processing unit and a memory (not shown), wherein the memory component may store non-transient instructions that are executable by the processing unit to carry out the methods described herein. The processing unit may be configured to receive and evaluate signals from various sensor(s) (e.g. pressure sensor, temperature sensor, etc.) and may adjust engine operation based on the received signals and instructions stored on a memory of the control and/or regulating electronics. To enable suitable operation of the internal combustion engine responsive to sensor signals, the control and/or regulating electronics 14 may be connected via individual signal connections S to the gas switching valve 8, the high-pressure pump 9, the pressure-limiting valve 10, the LPG injection valves 12, and the CNG injection valves 13 in order to be able to control said components as described in detail in FIGS. 2-3. Furthermore, the control and/or regulating electronics for controlling and/or regulating the operation of the internal combustion engine may be implemented in a software that may be implemented in existing vehicle electronics, either integrated with engine electronics, or as a separate unit.

The control and/or regulating electronics 14 may be configured to determine an aggregate state of the respective fuel disposed in the fuel distributor 11. In one example, the aggregate state of the respective fuel disposed in the fuel distributor 11 may be determined from one or more of a temperature occurring in the fuel distributor 11, a pressure occurring in the fuel distributor 11, and a composition of the fuel in the fuel distributor. For this purpose, the engine system 1 may comprise a sensor unit 15 positioned on the fuel distributor 11 that may include a temperature sensor (not shown) and a pressure sensor in one example (not shown). In other examples, separate temperature and pressure sensors may be provided. The sensor unit 15 may also be directly connected via a signal connection S to the control and/or regulating electronics 14 such that temperature and pressure measurements may be relayed to the control and/or regulating electronics. In addition, the engine system 1 may comprise another sensor (not shown) for detecting the composition of the respective fuel in the fuel distributor. In one example, said sensor may be a lambda sensor e.g. a UEGO (Universal Exhaust Gas Oxygen) sensor. The UEGO sensor may be close coupled to the exhaust of an engine optionally operating on two kinds of fuel and may measure oxygen levels in exhaust. The controller may then compare the residual oxygen content present in the exhaust with the oxygen level in ambient air and/or fuel injection amount and may further identify rich vs. lean fuel/air ratio. The lambda/UEGO sensor may be in connection with the control and/or regulating electronics, which may use the sensor information to adjust fuel choice and thus accordingly control engine operation. In other examples, the engine system may comprise a corresponding dedicated sensor for each type of fuel. In other examples, the sensor may comprise separate components to determine the individual composition of each of the two types of fuel in the fuel distributor. For example, for the determination of the composition of the LPG fuel, the mixture ratio of butane and propane in the LPG fuel may be determined and during the determination of the composition of the CNG fuel, in particular the methane component of the CNG fuel may be determined.

Using information acquired from the above mentioned temperature, pressure, and fuel composition sensors, the aggregate state of the respective fuel disposed in the fuel distributor may be determined by the control and/or regulating electronics 14. The engine system 1 may also comprise a further sensor unit 16, with which a pressure and a temperature of the LPG fuel upstream of the high-pressure pump 9 is detected. In addition, said further sensor unit 16 may also be connected via a signal connection S to the control and/or regulating electronics.

The engine system 1 comprises a line 17 that connects an LPG line segment 18 lying upstream of the high-pressure pump 9 to a CNG line segment 19 disposed downstream of the pressure-limiting valve 10 and in which a spring-loaded non-return valve 20 is disposed. This enables a gaseous LPG fuel disposed in the LPG line segment 18 to be transferred to the CNG line segment 19 from a certain pressure. In other examples, a switchable 2-way valve (not shown) may be used.

Figure 2:
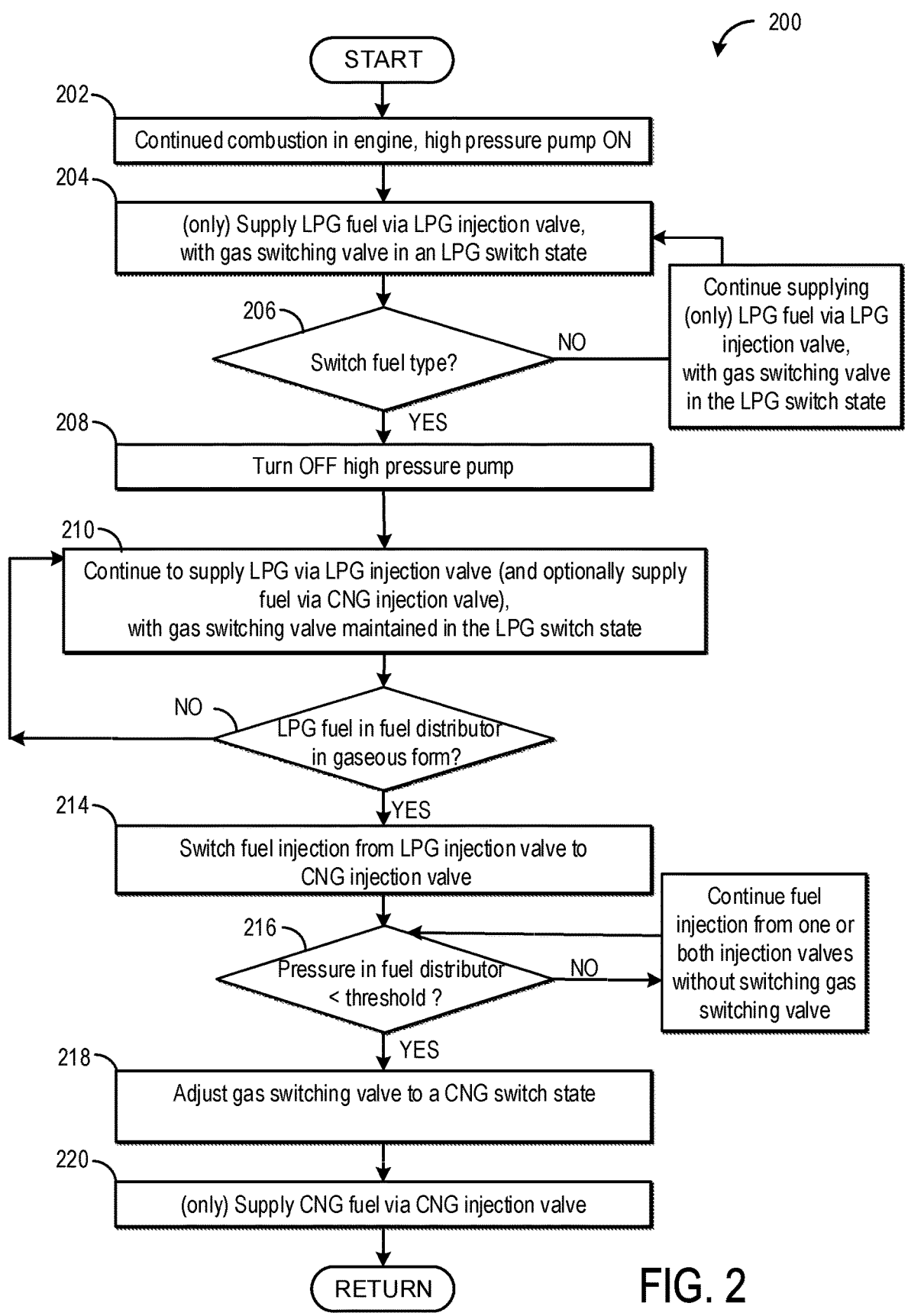
FIG. 2 shows an example method for an internal combustion engine switching from an LPG fuel supply to a CNG fuel supply.

FIG. 2 shows an example method 200 for an internal combustion engine switching from an LPG fuel supply to a CNG fuel supply. Instructions for carrying out method 200 and the rest of the methods included herein may be executed by a controller (e.g. control and/or regulating electronics 14) based on instructions stored on a memory of the controller and in conjunction with signals received from sensors of the engine system, such as the sensors described above with reference to FIG. 1. The controller may then adjust engine operation responsive to sensor signals, according to the methods described below.

At 202, method 200 includes an operating an internal combustion engine with continued combustion and with the high pressure pump turned on. An operating internal combustion engine with a working high pressure pump may be carrying out combustion using the LPG fuel, in one example. At 204, method 200 includes supplying LPG fuel to each of the combustion cylinders via the associated respective LPG injection valves (e.g., to cylinders 3 via LPG injection valves 12), with the gas switching valve (e.g., gas switching valve 8) in an LPG switch state. The gas switching valve may be an electrically controlled gas switching valve that may be under the control of an electric actuator controlled by the control and/or regulating electronics 14. Further, the gas switching valve may be configured to switch from an LPG switch state to a CNG switch state, in one example. In the LPG state, the gas switching valve may fluidically couple the LPG fuel supply to the fuel distributor, while blocking fluidic coupling of the CNG fuel supply to the fuel distributor. In the CNG state, the gas switching state may fluidically couple the CNG fuel supply to the fuel distributor while blocking fluidic coupling between the LPG fuel supply and the fuel distributor.

To enable a switch over from the LPG fuel to the CNG fuel, the control and/or regulating electronics 14 may determine whether a switch between fuel types is indicated. In one example, the decision to switch between fuel types may be determined by the control and/or regulating electronics based on engine operating conditions. For example, the switch in fuel types may be determined based on fuel availability, engine speed and/or load, engine knock, and/or other parameters. In another example, a lambda sensor e.g. UEGO sensor coupled to the exhaust system may send a signal to the control and/or regulating electronics indicating the fuel mixture being too rich or too lean. Based on the sensor information, the control and/or regulating electronics may accordingly make a decision to switch between fuel types. In another example, a controller may make a decision to switch fuels dependent on engine load and speed and engine performance desired. Further, increased NOx and unburned hydrocarbon emissions detected by sensors, may also allow for switching between fuels.

At 206, method 200 determines if a switch in fuel type is indicated. If it is determined that a change in fuel is not indicated (i.e. NO at 206), then method 200 loops back to 204 to maintain supplying LPG fuel via the LPG injection valves, with the gas switching valve in an LPG switch state. However, if the control and/or regulating electronics determines a switch of fuel type is indicated (i.e. YES at 206), then in order to change over from an LPG fuel supply to a CNG fuel supply, the high pressure pump may be first turned off at 208. The high-pressure pump, e.g. high pressure pump 9, may be connected between the LPG fuel tank 6 and the gas switching valve 8 and may be used to produce an LPG fuel pressure at the fuel distributor that is of sufficient pressure for direct injection. For example, an LPG fuel pressure in the range from 100 bar through 200 bar, in particular from 150 bar, may be produced with the high-pressure pump. Following turning the high pressure pump off, LPG fuel may continue to be supplied via the LPG injection valves with the gas switching valve in the LPG switch state at 210, and as a result of decreasing LPG fuel in the fuel distributor (due to the high-pressure pump being turned off), the pressure in the fuel distributor may be reduced. As a consequence of reduced pressure and at a given temperature, LPG fuel may become gaseous within the fuel distributor.

At 212, method 200 determines whether the LPG fuel in the fuel distributor is present in gaseous form. As described above, the aggregate state of the fuel in the fuel distributor may be determined based on a temperature and/or pressure of the distributor and/or fuel composition. If the LPG fuel is not determined to be in gaseous form (e.g. NO at 212), then method 200 loops back to 210 to continue supplying LPG fuel via the LPG injection valves, with the gas switching valve in an LPG switch state. However, if method 200 determines that the LPG in the fuel distributor is gaseous (e.g. YES at 212), then method 200 proceeds to 214 and switches the fuel injection from the LPG injection valves to the CNG injection valves. The CNG injection valves may then inject gaseous LPG present in the fuel distributor, to all cylinders of the internal combustion engine, thereby further reducing fuel pressure in the fuel distributor. In some examples, when the CNG injection valves are activated following the determination that the LPG fuel is gaseous, the LPG injection valves may be deactivated such that only the CNG injection valves inject fuel. However, in other examples, both the CNG and LPG injection valves may be activated simultaneously following the determination that the LPG fuel in the distributor is gaseous. For example, the CNG injection valves may be ramped in (e.g., increasingly larger amounts of fuel may be injected via the CNG injection valves) while the LPG injection valves may be ramped out (e.g., increasingly smaller amounts of fuel may be injected via the LPG injection valves), until only the CNG injection valves are injecting fuel. By providing a ramp in for the CNG injection valves, inadvertent injection of liquid fuel via the CNG injection valves may be reduced, if at least some LPG fuel is still in liquid form in the distributor. Via air-fuel ratio feedback control, the controller may be able to confirm that the fuel in the distributor is gaseous before commanding the CNG injection valves to inject the full amount of fuel.

Method 200 further determines at 216 if the pressure in the fuel distributor is lower than a threshold. The threshold referred to at 216 may be a pre-determined pressure threshold in the fuel distributor and may have a value of approximately 20 bar (or lower). Further, the pressure in the fuel distributor may be determined via a pressure sensor (e.g. a pressure sensor incorporated in sensor unit 15). If the pressure in the fuel distributor is found to be above the threshold (e.g. NO at 216), then method 200 loops back to 214 to continue to inject fuel via the CNG injection valves. However, if the pressure in the fuel distributor is found to be lower than the threshold, method 200 moves forward to 218 to adjust the gas switching valve to be in a CNG switch state. Additionally, the pressure valve downstream of the CNG fuel supply (e.g., valve 10) may be activated. During the adjusting of the gas switching valve, fuel continues to be supplied to at least some of the cylinders, and combustion is occurring in the engine. Method 200 then proceeds to 220 to supply CNG fuel via the CNG injection valves. Once the switch to CNG fuel has been made, CNG fuel continues to be injected solely via the CNG injection valves and no fuel is supplied via the LPG injection valves. Method 200 then returns.

In this way, the control and/or regulating electronics may be configured to switch from an LPG fuel supply to a CNG fuel supply. In another embodiment, the control and/or regulating electronics may be further configured to switch from a CNG fuel supply to an LPG fuel supply, as described in detail in the method below.

Figure 3:
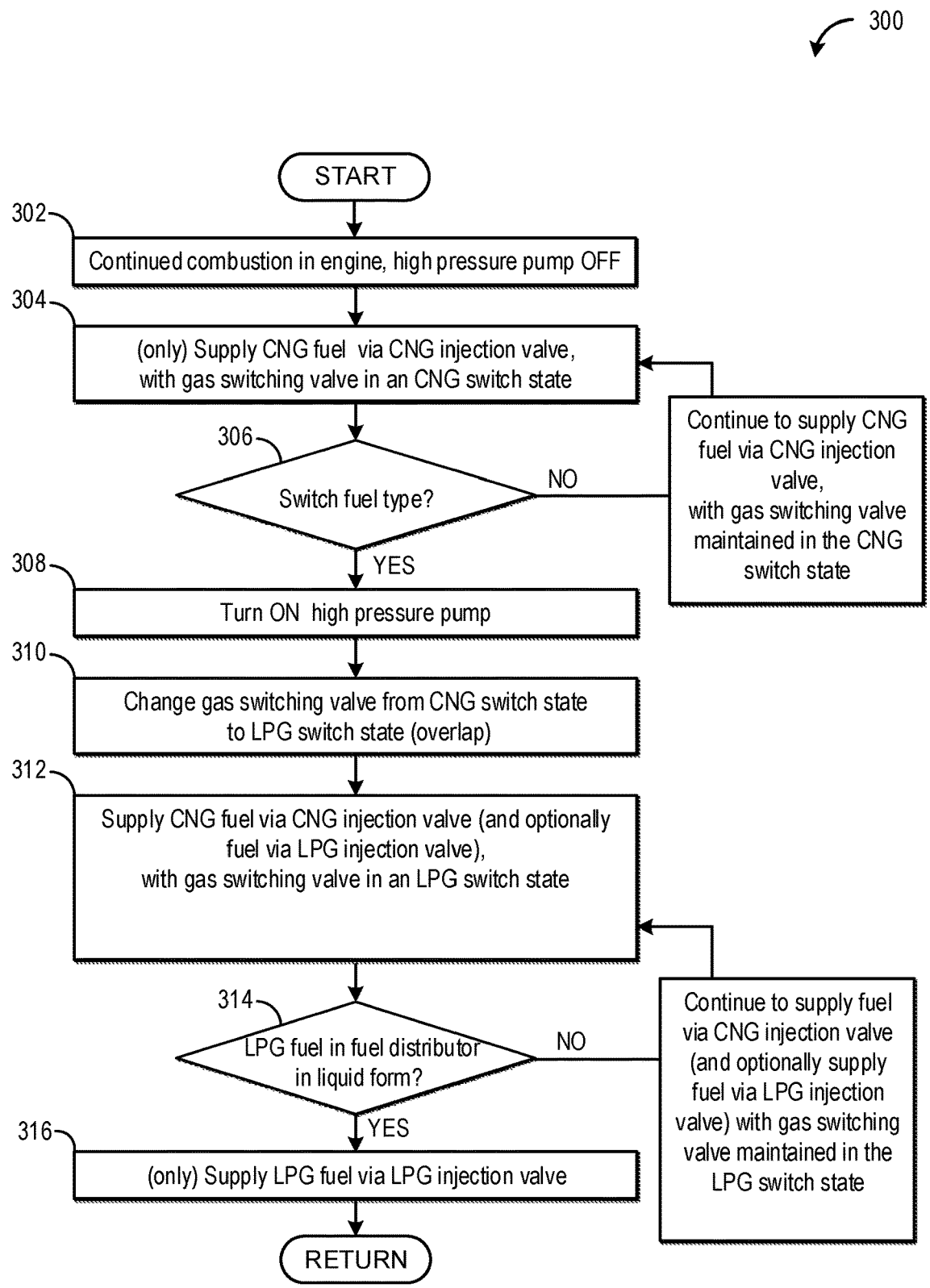
FIG. 3 shows an example method for an internal combustion engine switching from a CNG fuel supply to a LPG fuel supply.

Turning now to FIG. 3, an example method 300 for an internal combustion engine switching from a CNG fuel supply to a LPG fuel supply is illustrated. Instructions for carrying out method 300 and the rest of the methods included herein may be executed by the control and/or regulating electronics. At 302, method 300 includes an operating internal combustion engine with continued combustion and with the high pressure pump turned off. An operating internal combustion engine with the high pressure pump turned off may be carrying out combustion using the CNG fuel, in one example. At 304, method 300 includes supplying CNG fuel to each of the combustion cylinders 3, via the CNG injection valves, with the gas switching valve in a CNG switch state. Additionally, the pressure valve downstream of the CNG fuel supply (e.g., valve 10) may be active. The CNG fuel may be supplied to the CNG injection valves with the pressure of the fuel reduced by a pressure-limiting valve 10, and may be passed via the gas switching valve in the CNG switch state.

At 306, method 300 determines if a switch in fuel type is indicated. The switch in fuel types may be determined based on fuel availability, engine speed and/or load, engine knock, and/or other parameters. If it is determined that a change in fuels is not indicated (i.e. NO at 306), then method 300 loops back to 304 to maintain supplying CNG fuel via the CNG injection valves, with the gas switching valve in the CNG switch state. However, if the control and/or regulating electronics determines a switch in fuel type is indicated (i.e. YES at 306), then in order to change over from a CNG fuel supply to an LPG fuel supply, the high pressure pump may be first turned on at 308. The high-pressure pump 9 may be connected between the LPG fuel tank 6 and the gas switching valve 8 and may be used to produce an LPG fuel pressure sufficient for direct injection as described above with reference to FIGS. 1-2. Once the high pressure pump is turned on, method 300 may proceed to 310, to change the gas switching valve from the CNG switch state to an LPG switch state, referred to as the overlap period. The gas switching valve may be adjusted from the CNG position to the LPG position after a determined time period has elapsed following activation of the high-pressure pump. The time delay may be based on the current pressure in the distributor and desired distributor pressure as determined by current operating conditions. For example, during low load conditions (e.g., idle), the distributor may be pressurized to a different pressure than during higher load conditions. Method 300 then moves to 312 to supply CNG fuel via the CNG injection valve with gas switching valve in an LPG switch state. In some examples, during the temporary overlapping period wherein a switch between fuels is yet to be established, both LPG injection valves and CNG injection valves may be used for injection over a certain period of time.

Following turning the high pressure pump on, CNG fuel may continue to be supplied via CNG injection valves with the gas switching valve in the LPG switch state until liquid LPG fuel is detected in the fuel distributor, such that as a consequence of increased pressure (via the high pressure pump) and at a given temperature, LPG fuel may be in liquid aggregate form within the fuel distributor. In one example as described before, the liquid aggregate form of LPG in the fuel distributor may be sensed by sensor unit 15 including temperature and pressure sensors in communication with the control and/or regulatory electronics 14 and/or based on the determined fuel composition. At 314, method 300 determines whether the LPG fuel in the fuel distributor is present in liquid form. If the LPG fuel is not found in a liquid form (i.e. NO at 314), then method 300 loops back to 312 to continue supplying CNG fuel via CNG injection valves with the gas switching valve in the LPG switch state. However, if the LPG fuel is detected in a liquid form (i.e. YES at 314), then method 300 moves forward to 316 to supply LPG fuel via the LPG injection valves. Once the switch from CNG fuel supply to an LPG fuel supply has been made, LPG fuel continues to be injected solely via the LPG injection valves and no fuel is supplied via the CNG injection valve. Method 300 then returns.

In some examples, when the LPG injection valves are activated following the determination that the fuel in the distributor is liquid, the CNG injection valves may be deactivated such that only the LPG injection valves inject fuel. However, in other examples, both the CNG and LPG injection valves may be activated simultaneously following the determination that the fuel in the distributor is liquid. For example, the LPG injection valves may be ramped in (e.g., increasingly larger amounts of fuel may be injected via the LPG injection valves) while the CNG injection valves may be ramped out (e.g., increasingly smaller amounts of fuel may be injected via the CNG injection valves), until only the LPG injection valves are injecting fuel. However, to avoid inadvertent injection of liquid fuel via the CNG injection valves (which may inject larger fuel volumes than the LPG injection valves), the CNG injection valves may be ramped down more quickly than the LPG injection valves were ramped out when switching to CNG fuel.

In this way, the control and/or regulating electronics 14 are configured to change over from a LPG supply to a CNG supply. In an LPG supplied internal combustion engine, the high-pressure pump 9 is turned on and the LPG fuel is passed via the gas switching valve 8 in a LPG switch state to the LPG injection valves 12 and is injected into the cylinders 3 via the LPG injection valves 12. In contrast, in an LPG supplied internal combustion engine, the CNG fuel with the pressure thereof reduced by the pressure-limiting valve 10 is passed via the gas switching valve 8 in a CNG switch state to the CNG injection valves 13 and is injected via the CNG injection valves 13 into the cylinders 3. The switching method comprises first turning off the high-pressure pump 9, then in the presence of a gaseous aggregate state of the LPG fuel disposed in the fuel distributor 11, a rapid and temporary change over with an overlap from injection via the LPG injection valves 12 to injection via the CNG injection valves 13 is made. Finally, the gas switching valve 8 is switched from the LPG switch state to the CNG switch state.

Furthermore, the control and/or regulating electronics 14 are arranged to change over from the CNG supply, whereby the CNG fuel with the pressure thereof reduced by the pressure-limiting valve 10 is passed via the gas switching valve 8 in the CNG switch state to the CNG injection valves 13 and is injected via the CNG injection valves 13 into the cylinders 3, to the LPG supply, whereby the high-pressure pump 9 is turned on and the LPG fuel is passed via the gas switching valve 8 in the LPG switch state to the LPG injection valves 12 and is injected via the LPG injection valves 12 into the cylinders 3, first to switch on the high-pressure pump 9, then to switch the gas switching valve 8 from the CNG switch state to the LPG switch state and then in the presence of a liquid aggregate state of the LPG fuel disposed in the fuel distributor 11 to rapidly and temporarily change over with an overlap from injection via the CNG injection valves 13 to injection via the LPG injection valves 12.

In some examples, pump 9 pressurizes LPG fuel but not CNG, where the CNG is supplied from the tank 7 to the distributor 11 without being compressed by a pump throughout the entire path therebetween.

In some examples including any of those noted above, the dynamic range of the CNG fuel injector is higher than that of the LPG injector and/or a fully opened nozzle size of the CNG injector is larger than that of the LPG injector.

In some examples including any of those noted above, a method may include operating with the engine combusting, and throughout combusting operation, switching fuel injection from each of LPG only injection to CNG only injection and LPG only injection to CNG only injection. During the transition from one to the other (e.g., from LPG only injection to CNG only injection or vice versa), both CNG and LPG injectors may be used in some examples. As noted above, these are merely labels as any of the injectors may have either LPG or CNG flowing through it depending on the state of the rail, but such terminology is used here to differentiate that there are at least two separate and distinct injectors for a given cylinder, and the injectors have different physical structures such as the size of the nozzle noted above. There may be other physical distinctions as well, including the mounting angle in the cylinder, the injection location in the cylinder, the targeting of the injector in the cylinder, the number of nozzle openings, etc., as at least partially illustrated in FIG. 1.

Continuing with the example above, the method may include operating the engine to combust with LPG fuel via the LPG injector, with the rail having LPG stored therein as pressurized by the operating pump 9. The switching valve is in the LPG switch state. Upon a determination to switch fuel types, the method further includes disabling the high pressure pump 9 while continuing to combust and inject LPG fuel via the LPG injector as the rail pressure now starts to decrease with each LPG injection. Here, the switching valve is maintained in the LPG switch state. If the rail pressure drops below a threshold pressure (e.g., set based on the minimum rail pressure to meet the current fuel request at the current engine operating load and speed at a maximum LPG injector opening/pulse width), yet there is still liquid fuel determined to be in the rail (e.g., via the dynamic model carried out in the controller in real time), then additional fuel injection may be provided by, for the same combustion event in a given cylinder, performing both LPG injector injection and CNG injector injection for that given cylinder in order to, in total between the two injections, provide the desired fuel amount for that combustion even, e.g., to maintain a desired air/fuel ratio such as stoichiometry based on the amount of air estimated to be in the cylinder. An example of this operation is provided in FIG. 4.

Figure 4:
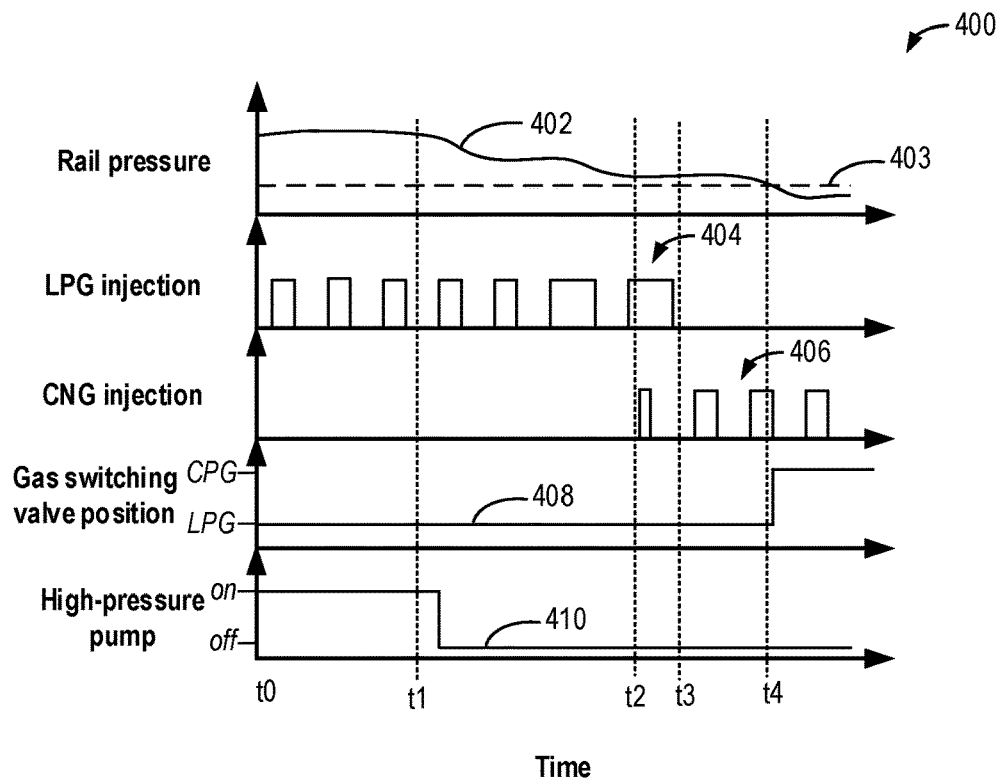
FIGS. 4 and 5 are example timing diagrams.

FIG. 4 shows an example diagram 400 of operating parameters of interest during a switch from operation with LPG fuel to operation with CNG fuel. The depicted operating parameters include rail pressure (e.g., the pressure in the fuel distributor 11 as sensed by sensing unit 15), LPG injection pulse width (e.g., of LPG injection valve 13), CNG injection pulse width (e.g., of CNG injection valve 12), gas switching valve position (e.g., valve 8), and high-pressure pump status (e.g., of pump 9). Time is depicted along the x-axis (horizontal axis) while respective values for each operating parameter are depicted along the y-axis (vertical axis). Diagram 400 illustrates LPG and CNG pulse width for an LPG injector and CNG injector, respectively, of a single cylinder.

At time t0, the engine is being supplied with only LPG fuel. As such, the fuel rail is pressurized, as shown by plot 402, LPG injection is occurring via the LPG injectors, as shown by plot 404, the gas switching valve is positioned in the LPG position to provide LPG fuel to the fuel rail, as shown by plot 408, and the high-pressure pump is active, as shown by plot 410. Further, as shown by plot 406, no injection is occurring via the CNG injector.

Fuel injection from only the LPG injector continues from time t0 to time t2. At time t1, a command is received to switch from LPG fuel to CNG fuel. As a result, the high-pressure pump is deactivated following time t1. Due to the deactivation of the pump and continuing injection from the LPG injectors, the rail begins to depressurize after time t1. Because the rail is at a lower pressure, the pulse width of the LPG injector may be increased in order to maintain desired air-fuel ratio. At time t2, the CNG injector is activated. In one example, the CNG injector may be activated responsive to a determination that the fuel in the fuel rail is gaseous or substantially gaseous (e.g., at least 75% gaseous fuel). Owing to the decrease in pressure at the rail (and concurrent decrease in rail temperature), the LPG may change from a liquid state to a gaseous state. The state of the fuel in the rail may be determined based on rail pressure and temperature. During a brief overlap period from time t2 to time t3, both the LPG injector and CNG injector are activated and injecting LPG fuel. As shown, the CNG injection pulse width may ramp up from a smaller pulse width prior to time t3 to a larger pulse width following time t3.

At time t3, the LPG injector is deactivated and fuel no longer is injected from the LPG injector. Further, the pulse width of the CNG injection may increase to maintain desired air-fuel ratio. At time t4, the rail pressure has reached a threshold pressure (shown by line 403). The threshold pressure may be 20 bar or other suitable pressure at which CNG may begin to be supplied to the rail. Thus, at time t4, the gas switching valve may switch from the LPG position to the CNG position to commence supply of CNG to the rail. Further, during all of the times depicted in FIG. 4 following deactivation of the pump, the pump remains deactivated. Fuel continues to be supplied to the engine during the deactivation of the pump and changing of the position of the gas switching valve.

Figure 5:
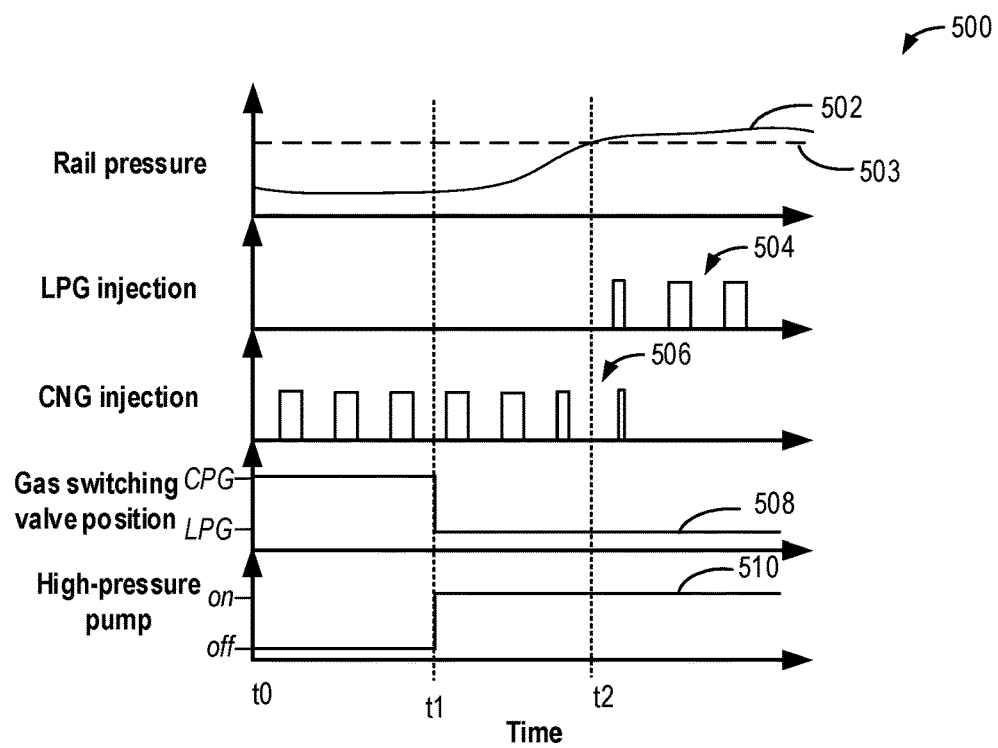

FIG. 5 shows an example diagram 500 of operating parameters of interest during a switch from operation with CNG fuel to operation with LPG fuel. The depicted operating parameters include the same operating parameters as illustrated in FIG. 4, including rail pressure (shown by plot 502), LPG injection pulse width (shown by plot 504), CNG injection pulse width (shown by plot 506), gas switching valve position (shown by plot 508), and high-pressure pump status (shown by plot 510). Time is depicted along the x-axis (horizontal axis) while respective values for each operating parameter are depicted along the y-axis (vertical axis). Diagram 500 illustrates LPG and CNG pulse width for an LPG injector and CNG injector, respectively, of a single cylinder.

At time t0, CNG fuel is being supplied to the engine. Hence the pump is deactivated, the gas switching valve is in the CNG position, CNG is being injected from the CNG injectors, and the rail pressure is relatively low (e.g., below the threshold shown by line 503, which may be the same threshold as discussed above with respect to FIG. 4). Fuel is not supplied via the LPG injector. At time t1, a command is received to switch from CNG fuel to LPG fuel. Hence, the high pressure pump is activated and at the same time, the gas switching valve is moved to the LPG position. Following time t1, fuel injection continues from the CNG injector and the rail begins to pressurize. The pulse width of the CNG injector may decrease as the rail pressure increases, down to the minimum pulse width of the CNG injector.

At time t2, the rail pressure may reach the threshold, indicating that the fuel in the rail is liquid. A further CNG injection event may occur, and then the CNG injector may be deactivated. Also at time t2, fuel injection via the LPG injector commences. Thus, for a brief overlap period, fuel may be provided via both the LPG injector and the CNG injector. The LPG injector may inject fuel at a lower pulse width during the overlap period. Once the CNG injector is deactivated, fuel is supplied only via the LPG injector, at a higher pulse width in the illustrated example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine system, comprising:
   a direct-injection internal combustion engine including a cylinder;
   an LPG tank for storing an LPG fuel;
   a CNG tank for storing a CNG fuel;
   an electrically controlled gas switching valve;
   a high-pressure pump connected between the LPG tank and the gas switching valve;
   a pressure-limiting valve connected between the CNG tank and the gas switching valve;
   a fuel distributor configured to be supplied with one or more of the LPG fuel and the CNG fuel via the gas switching valve;
   an LPG injection valve coupled to the cylinder;
   a CNG injection valve coupled to the cylinder, the LPG injection valve and the CNG injection valve configured to be supplied with fuel via the fuel distributor; and
   a controller configured to control the gas switching valve depending on an aggregate state of the fuel disposed in the fuel distributor, wherein, during a condition, there is an overlap period in which fuel is provided via both the LPG injection valve and the CNG injection valve, with the LPG injection valve injecting fuel at a lower pulse width during the overlap period.

2. The internal combustion engine system as claimed in claim 1, wherein the controller is configured to determine the aggregate state of the fuel disposed in the fuel distributor from a temperature of the fuel distributor, a pressure of the fuel distributor, and/or a determined composition of the fuel in the fuel distributor.

3. The internal combustion engine system as claimed in claim 2, further comprising at least one temperature sensor disposed on the fuel distributor and at least one pressure sensor disposed on the fuel distributor.

4. The internal combustion engine system as claimed in claim 2, further comprising at least one sensor for detecting the composition of the fuel in the fuel distributor.

5. The internal combustion engine system as claimed in claim 1, wherein the controller is configured to change over from an LPG supply of the LPG fuel to the fuel distributor to a CNG supply of the CNG fuel to the fuel distributor by:
   first switching off the high-pressure pump,
   then, responsive to a gaseous aggregate state of the LPG fuel disposed in the fuel distributor, changing over with the overlap period from injection via the LPG injection valve to injection via the CNG injection valve, and
   then switching the gas switching valve from an LPG switch state to a CNG switch state.

6. The internal combustion engine system as claimed in claim 5, wherein the controller is configured to change over from the CNG supply to the LPG supply by:
   first turning on the high-pressure pump,
   then switching the gas switching valve from the CNG switch state to the LPG switch state, and
   then, responsive to a liquid aggregate state of the LPG fuel disposed in the fuel distributor, changing over with the overlap period from injection via the CNG injection valve to injection via the LPG injection valve.

7. The internal combustion engine system of claim 6, wherein, when operating with the LPG supply, the high-pressure pump is turned on and the LPG fuel is passed via the gas switching valve in the LPG switch state to the LPG injection valve and is injected via the LPG injection valve, and wherein, when operating with the CNG supply, the CNG fuel with pressure thereof reduced by the pressure-limiting valve is passed via the gas switching valve in the CNG switch state to the CNG injection valve and is injected via the CNG injection valve.

8. A method, comprising:
   operating with injection of LPG pressurized at a fuel rail via a pump, the injection of LPG through only a first injector to a cylinder;
   deactivating the pump and subsequently increasing an LPG injection pulse width while continuing the LPG injection through the first injector;
   subsequently coupling a CNG source to the fuel rail, responsive to a determination that the LPG in the fuel rail is in gaseous form, while continuing the LPG injection with the first injector; and
   responsive to reaching a condition, deactivating the first injector and operating with only a second injector injecting CNG to the cylinder, wherein, during an overlap period before deactivating the first injector, fuel is injected from both the first injector and the second injector with the first injector injecting at a lower pulse width during the overlap period.

9. The method of claim 8, wherein, during the subsequent coupling of the CNG source to the fuel rail, the pump is still deactivated.

10. The method of claim 9, wherein, during the subsequent increasing of the LPG injection pulse width, the CNG source is not coupled to the fuel rail, and wherein the condition is a fuel rail pressure reaching a threshold pressure.

11. An engine method, comprising:
   operating with injection of LPG pressurized at a rail via a pump, the injection of LPG through only a first injector to a cylinder;
   deactivating the pump and subsequently gradually increasing an LPG injection pulse width while continuing LPG injection through the first injector while rail pressure decreases with the pump still deactivated and without injection from a second injector to the cylinder;
   subsequently coupling a CNG source to the rail via a switching valve, responsive to a determination that the LPG in the fuel rail is in gaseous form, while continuing the LPG injection with the first injector;
   responsive to reaching a threshold rail pressure, deactivating the first injector and operating with only the second injector injecting CNG to the cylinder, a pulse width of the second injector adjusted to account for continued decrease of the rail pressure and to maintain a desired air-fuel ratio in the cylinder;

responsive to a request for LPG fuel and discontinuing of CNG injection, reactivating the pump and simultaneously switching the switching valve; and discontinuing injection from the second injector and delivering fuel only via the first injector responsive to the rail pressure reaching a threshold and based on an estimate of a fuel state in the rail, wherein, during an overlap period before deactivating the first injector, fuel is injected from both the first injector and the second injector with the first injector injecting at a lower pulse width during the overlap period.

12. The method of claim 11, wherein the estimate of the fuel state in the rail comprises an estimate of a proportion of liquid fuel in the rail.

13. The method of claim 11, wherein operating with injection of LPG comprises coupling an LPG source to the rail via the switching valve in an LPG position, wherein subsequently coupling the CNG source to the rail via the switching valve while continuing injection with the first injector comprises subsequently coupling the CNG source to the rail via the switching valve in a CNG position, and wherein simultaneously switching the switching valve comprises simultaneously switching the switching valve to the LPG position.

14. The system of claim 5, wherein changing over with the overlap period from injection via the LPG injection valve to injection via the CNG injection valve includes increasing a pulse width of the LPG injection valve.

15. The system of claim 14, wherein changing over with the overlap period from injection via the LPG injection valve to injection via the CNG injection valve further includes, once the LPG injection valve is deactivated, adjusting a pulse width of the CNG injection valve to account for continued decrease of fuel distributor pressure and to maintain a desired air-fuel ratio in the cylinder.

16. The method of claim 8, further comprising controlling an electrically-controlled gas switching valve depending on an aggregate state of fuel disposed in the fuel rail.

17. The method of claim 16, wherein operating with injection of LPG includes operating the gas switching valve in an LPG switch state and wherein subsequently coupling the CNG source to the fuel rail includes switching the gas switching valve to a CNG switch state depending on the aggregate state of the fuel disposed in the fuel rail.

18. The method of claim 16, further comprising determining the aggregate state of the fuel disposed in the fuel rail from a temperature of the fuel rail, a pressure of the fuel rail, and/or a determined composition of the fuel in the fuel rail.

19. The method of claim 18, wherein the temperature of the fuel rail is determined based on output from a temperature sensor disposed on the fuel rail, the pressure of the fuel rail is determined based on output from a pressure sensor disposed on the fuel rail, and/or the determined composition of the fuel in the fuel rail is determined based on output from a sensor for detecting a composition of fuel in the fuel rail.

* * * * *